March 31, 1942.  N. G. MONSARRAT ET AL  2,278,148
SLUDGE COLLECTING MEANS FOR FILTERS
Filed Feb. 12, 1940   3 Sheets-Sheet 3

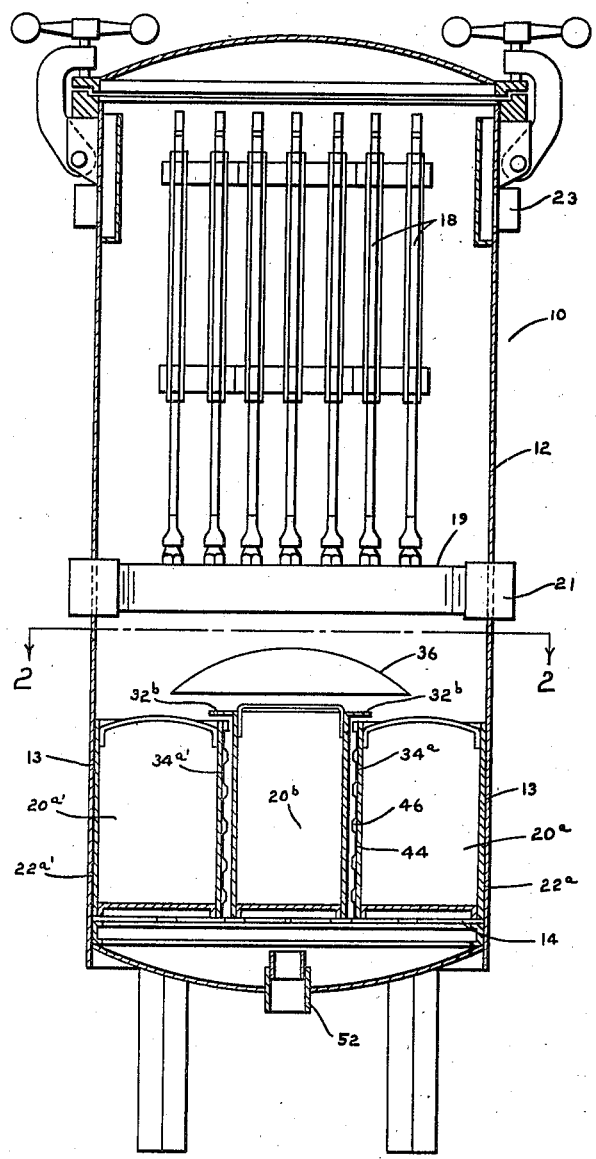

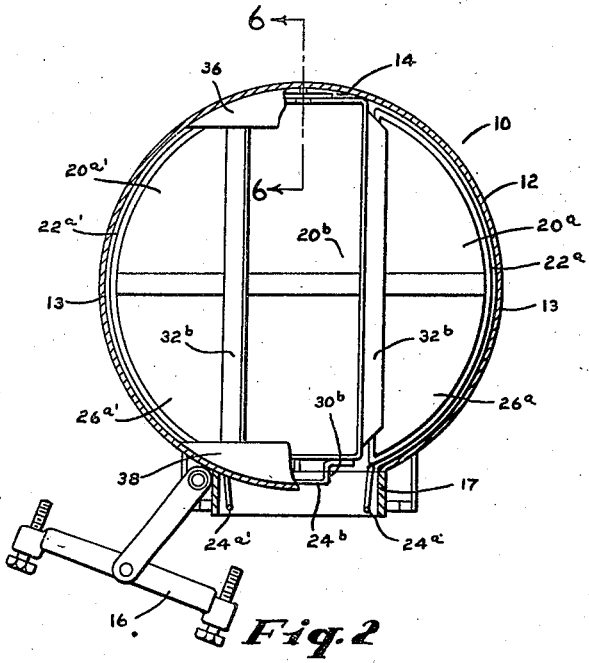
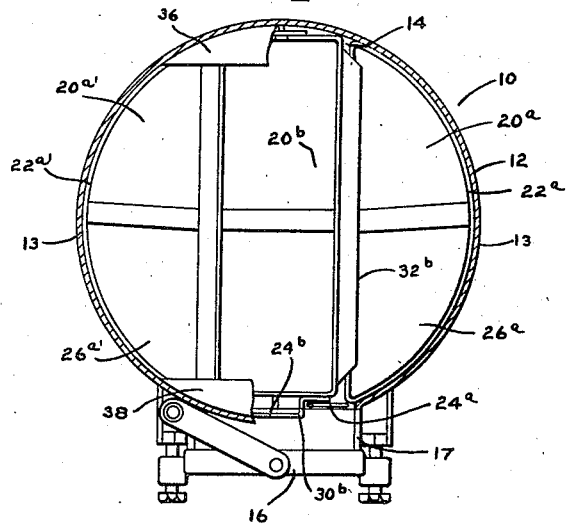

Inventors
Nicholas G. Monsarrat
& Norman S. Humes
By Thomas A. Jenkes
Attorney

Patented Mar. 31, 1942

2,278,148

UNITED STATES PATENT OFFICE 2,278,148

SLUDGE COLLECTING MEANS FOR FILTERS

Nicholas G. Monsarrat, East Providence, and Norman S. Humes, Lincoln, R. I., assignors to Pantex Pressing Machine, Inc., Central Falls, R. I., a corporation of Delaware Application February 12, 1940, Serial No. 318,438

11 Claims. (Cl. 210—181)

Our invention relates to improvements in sludge collecting means for filters and is particularly adapted for use in pressure filters having a plurality of filter screens positioned within said casing, and pan means in the lower portion of said filter casing adapted to collect the sludge.

For this purpose we provide pan means, adapted to substantially cover a suitable platform in said filter casing below said screens, comprising a plurality of pans, each of a width to be readily removable through a suitable door in said casing above said platform. We are aware that others have provided a plurality of pans for this purpose and in order to prevent the leakage of sludge around and between said separate pans have provided baffle means for this purpose. We have found that the use of baffle means for this purpose has not been satisfactory, for in order to make the pans loose enough for their ready removal and insertion, it has been necessary to place the baffle means so high that it does not prevent the leakage of sludge around the baffle means and edges of the pans.

A further object of our invention is to reduce the employment of baffle means to a minimum in this type of construction and to provide a novel type of means to substantially eliminate leakage of sludge, comprising means to urge the outer walls of the outer segmental pans in sealed engagement with the adjacent portions of the walls of the filter casing to reduce to a minimum leakage along these respective lines of contact.

A further object of our invention is to provide a construction in which the filter may be continuously drained without the accumulation of sludge in the drain pipe until the sludge pans are substantially filled.

A further feature of our invention relates to the specific means we preferably employ to achieve this sealing feature, which comprises a specific form of handle means for the individual sludge pans which are a necessary adjunct to permit their ready removal through the door of the casing, thereby permitting said respective handles to perform a double function, namely, (1) functioning as removing and inserting means for the pans as well as (2) the means of sealing the walls of the outer segmental pans against the walls of the filter casing.

Further features of our invention relate to the specific construction of the means we preferably employ for the above purpose.

These and such other objects of our invention as may hereinafter appear will be best understood from a description of the accompanying drawings which illustrate an embodiment thereof.

In the drawings, Fig. 1 is a vertical sectional view looking through an entire pressure filter casing employing our invention, showing the filter screens and supporting manifold in elevation and the sludge pans in latched sealing engagement.

Fig. 2 is a horizontal sectional view taken along the line 2—2 of Fig. 1, with portions of the end baffles broken away.

Fig. 3 is a vertical sectional view similar to Fig. 1 with the filter door in open position and the filter pan handles moved to a position releasing the outer sludge pans from sealing engagement with the walls of the casing.

Figure 5:
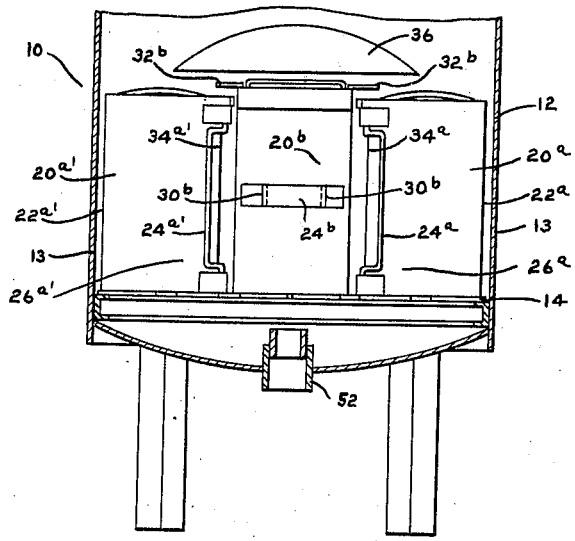
Fig. 5 is a front elevational view similar to Fig. 4, but with the parts moved to the unlatched position shown in Fig. 3.

In the drawings, wherein like characters of reference indicate like parts throughout, 10 generally indicates a pressure filter constructed in accordance with my invention, said filter including the usual casing 12 comprising an upright cylinder. While we preferably employ a true cylinder, it is obvious that if desired the walls may be made of polygonal or other shape approximating a cylinder and in the claims we employ the word "cylinder" to include such constructions. Said cylinder is provided with a perforate, removable horizontal platform 14 therein preferably near the lower end thereof and a door 16 therein above said platform 14, preferably with the lower edge thereof in alignment with the upper surface of said platform 14. As is usual in a pressure filter, the upper end of the casing is provided with a plurality of filter screens 18 extending vertically therein mounted on a suitable manifold 19 extending across said casing.

Said manifold 19 is hollow and is provided with the outlet 21 projecting exterior of said casing 12 to provide an outlet for the filter plates; an inlet 23 is also provided for said casing to provide a continuous circulation through said casing, the liquid circulating through the screens themselves and out through the manifold 19 and its outlet 21.

Pan means are provided to rest on said platform 14 to collect sludge, when the filter screens are scraped with filter scrapers (not shown), or otherwise cleaned.

In accordance with our invention, we employ a plurality of pans 20ª, 20ª' and 20ᵇ to make up said pan means. The pan means 20ª and 20ª' comprises a pair of segmental pans, each having arcuate outer walls 22ª and 22ª' of substantially the radius of the wall 13 of the cylindrical casing 12. All said pans, namely, the segmental pans 20ª and 20ª' and the substantially center rectangular pan 20ᵇ are preferably of a width to be readily removable through the door opening 17 on removal of the door 16 therefrom. Said segmental pans 20ª and 20ª' are also of a width to substantially cover the segmental portions of the platform extending on each side of the center portion exterior of the edges of the door opening 17.

We also employ a center substantially rectangular pan 20ᵇ also of a width to be readily insertable through said door opening 17 and to substantially cover the remainder of said platform 14 between said segment pans 20ª and 20ª'.

In accordance with our invention, we provide means to urge the outer arcuate walls 22ª and 22ª' of said segmental pans 20ª and 20ª' in sealing engagement with the adjacent portions of the wall 13 of said casing 12. Any suitable means may be provided for this purpose and said means may include arcuate front and rear ends of said center pan 20ᵇ to be brought into sealing engagement with the adjacent portion of the rear wall of the casing and the door 16 itself on closure of said door 16. We have found in practice, however, that it is desirable to provide supplemental means preferably comprising baffle means to prevent sludge from falling in the inter-pan space, namely, between the center pan 20ᵇ and the respective segmental pans 20ª and 20ª' and in the spaces between the front and rear of said center pan 20ᵇ and adjacent portions of the casing wall.

In our preferred embodiment, the means to urge the outer arcuate walls of said segmental pans in sealing engagement with the adjacent portions of the wall 13 of said casing includes a handle 24ᵇ extending horizontally in front of said center rectangular pan 20ᵇ, said handle being preferably of a U-shape projecting forwardly from the front end of said center pan 20ᵇ and vertically extending resilient handles 24ª and 24ª' respectively pivotally mounted on the front end of said segmental pans 20ª and 20ª' to pivot horizontally adapted when said respective handles 24ª and 24ª' are pivoted inwardly, after insertion of the pans through the door, to a position substantially tangential to the exterior of said composite pan means, to abut the ends of said central pan handle 24ᵇ to pivot the front ends 26ª and 26ª' of said respective segmental pans 20ª and 20ª' outwardly and as said respective handles 24ª and 24ª' are resilient to resiliently retain the arcuate outer walls 22ª and 22ª' of said respective segmental pans 20ª and 20ª' in sealing engagement with the adjacent portions of the wall 13 of said casing. The vertical resilient respective handles 24ª and 24ª' are preferably also U-shaped, so as to function against the ends 30ᵇ of the handle 24ᵇ of the center pan 20ᵇ. For this purpose the handles 24ª and 24ª' are preferably constructed of resilient wire.

In the embodiment of our invention shown, the baffle means to prevent sludge from falling in the inter-pan space is preferably carried by at least one of said pans and includes baffles 32ᵇ projecting laterally from the upper ends of the side walls of the center pan 20ᵇ to overlie the adjacent inner walls 34ª and 34ª' of the outer pans 20ª and 20ª' to thus prevent sludge from dropping in the inter-pan space.

Figure 6:
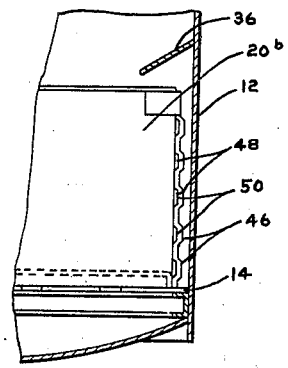
Fig. 6 is a vertical sectional view taken along the line 6—6 of Fig. 3.
Figure 4:
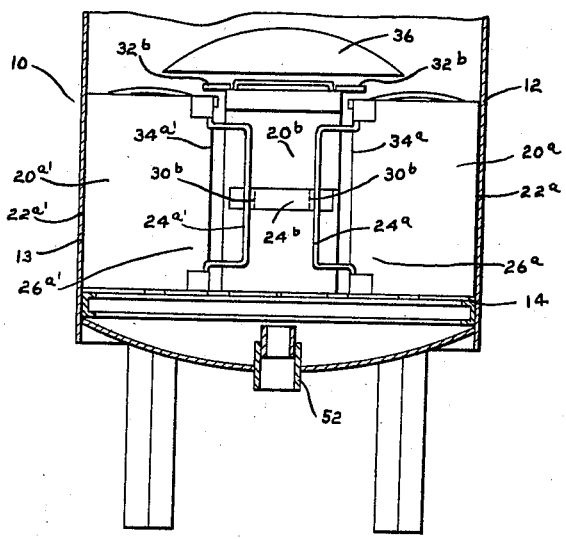
Fig. 4 is a front elevation of the lower end of the filter casing showing the casing wall in section with the filter pan handles pivoted to engage the walls of the filter pans in sealing engagement with the wall of the filter casing, the parts being in the same position as shown in Fig. 2.

In addition, in our preferred embodiment, we provide supplemental baffle means to prevent sludge from falling in the space between the front and rear of the center pan 20ᵇ and casing wall 13, which as shown, comprises a rear baffle plate 36 overlying the rear ends of said respective pans and the front baffle plate 38 overlying the front ends of said respective pans, these baffle plates 36 and 38 being more particularly shown in Figs. 2 and 3 and being partially broken away to show the sealing construction and operation of the baffle means 32ᵇ. As shown the respective front and rear edges of these baffle plates are suitably soldered or otherwise secured to the respective adjacent wall portions, and said baffle plates 36 and 38 are preferably mounted to be inclined downwardly as shown in Fig. 6 as they extend radially inwardly of the casing.

Figure 7:
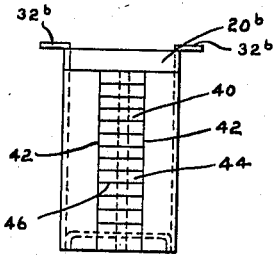
Fig. 7 is a rear elevation of the center pan.

In order to provide free circulation of the fluid through the filter we preferably construct the removable platform 14 so that the fluid may leak therethrough or therearound, preferably employing perforations therein, and to provide suitable leakage in the respective pans we preferably construct the continuous integral wall of each respective pan of slightly less length than the desired finished circumferential length of the pan, providing an opening 40 between the respective ends 42 of said wall, as more particularly shown in Fig. 7 illustrating the rear end of the center pan 20ᵇ and we cover said opening 40 by a vertically extending strip 44 of material suitably corrugated as at 46 to permit the passage of fluid out horizontally along the channel 48 of each respective horizontal corrugation 46, to be discharged laterally out the open ends 50 of said horizontal channels and through the opening 40. The inner side walls 34ª and 34ª' of the pans 20ª and 20ª' are similarly so constructed as shown in Fig. 1.

It is apparent that we have provided a sludge collecting means for filters comprising a plurality of pans which may be readily individually inserted and removed through the door opening 17, the segmental pans 20ª and 20ª' being inserted first by the aid of their respective handles 24ª and 24ª' and moved laterally of said casing over said platform 14 to the desired position in use on each side of the door opening 17. The center pan 20ᵇ may then be readily inserted through the door opening 17 with the aid of the handle 24ᵇ and the respective handles 24ª and 24ª' may then be suitably pivoted inwardly to a position substantially tangential to the exterior of said composite pan means to abut the respective ends 30ᵇ of the center pan handle 24ᵇ. It is obvious that the rear end of each respective segmental pan will thus be forced against the adjacent rear portion of each side wall of the center pan and the remainder of each respective segmental pan will be pivoted outwardly by the resiliency of the pan handles 24ª and 24ª' to abut the adjacent portions of the wall of the casing in sealing engagement therewith, the baffle means being either permanently connected as the baffle plates 36 and 38 or automatically placed in position by the insertion of the pans as the respective baffle plates 32ᵇ overlying the inner side walls 34ª and 34ª' of the segmental pans 20ª and 20ª'.

When the pans are full of sludge or if desired to remove them for any other purpose, the fluid is drained from the filter through the outlet 52, the door 16 removed from a position closing said door opening 17 and the respective segmental pan handles 24ᵃ and 24ᵃ′ pivoted outwards as shown in Fig. 3 to permit the removal of the center pan 20ᵇ by grasping the handle 24ᵇ and pulling the center pan 20ᵇ out through the door opening 17. The segmental pans 20ᵃ and 20ᵃ′ may be successively removed by pulling out on the respective handles 24ᵃ and 24ᵃ′. The sludge may then be dumped from the respective pans and the pans reinserted in the manner explained.

It is apparent that we have provided a novel type of sludge collecting means for filters readily removable, having a positive sealing action and with the other advantages explained above.

It is understood that our invention is not limited to the specific embodiment shown and that various deviations may be made therefrom without departing from the spirit and scope of the appended claims.

What we claim is:

1. A filter, including, in combination, a casing comprising an upright cylinder having a horizontal platform therein and a door therein above said platform, a plurality of filter screens positioned within said casing having inlet means and outlet means, pan means resting on said platform below said screens adapted to collect sludge, comprising a pair of segmental pans each having an arcuate outer wall of substantially the radius of said cylindrical casing wall and being of a width to be insertable through said door and to substantially cover said horizontal platform exterior of said door and a center substantially rectangular pan also insertable through said door of a width to substantially cover the remainder of the platform between said segmental pans and means to urge the outer arcuate walls of said segmental pans in sealing engagement with the adjacent portions of the wall of said casing comprising a handle extending horizontally in front of said rectangular pan and a vertically extending resilient handle mounted to pivot horizontally on a vertical axis on the front end of each segmental pan adapted when said handles are pivoted inwardly to a position substantially tangential to the exterior of said composite pan means to abut the ends of said central pan handle to pivot the front ends of said segmental pans outwardly and resiliently retain the outer walls thereof in sealing engagement with the adjacent portions of the wall of said casing and baffle means mounted to overlie said inter-pan space to prevent sludge from falling in the inter-pan space and in the spaces between the front and rear of said center pan and casing wall.

2. A filter, including in combination, a casing comprising an upright cylinder having a horizontal platform therein and a door therein above said platform, a plurality of filter screens positioned within said casing having inlet means and outlet means, pan means resting on said platform below said screens adapted to collect sludge, comprising a pair of segmental pans each having an arcuate outer wall of substantially the radius of said cylindrical casing wall and being of a width to be insertable through said door and to substantially cover said horizontal platform exterior of said door and a center substantially rectangular pan also insertable through said door of a width to substantially cover the remainder of the platform between said segmental pans, and means to urge the outer arcuate walls of said segmental pans in sealing engagement with the adjacent portions of the wall of said casing, comprising a handle extending horizontally in front of said rectangular pan and a vertically extending resilient handle mounted to pivot horizontally on a vertical axis on the front end of each segmental pan adapted when said handles are pivoted inwardly to a position substantially tangential to the exterior of said composite pan means to abut the ends of said central pan handle to pivot the front ends of said segmental pans outwardly and resiliently retain the outer walls thereof in sealing engagement with the adjacent portions of the wall of said casing and baffle means mounted to overlie said inter-pan space to prevent sludge from falling in the inter-pan space.

3. A filter, including in combination, a casing comprising an upright cylinder having a horizontal platform therein and a door therein above said platform, a plurality of filter screens positioned within said casing having inlet means and outlet means, pan means resting on said platform below said screens adapted to collect sludge, comprising a pair of segmental pans each having an arcuate outer wall of substantially the radius of said cylindrical casing wall and being of a width to be insertable through said door and to substantially cover said horizontal platform exterior of said door and a center substantially rectangular pan also insertable through said door of a width to substantially cover the remainder of the platform between said segmental pans and means to urge the outer arcuate walls of said segmental pans in sealing engagement with the adjacent portions of the wall of said casing, comprising a handle extending horizontally in front of said rectangular pan and a vertically extending resilient handle mounted to pivot horizontally on a vertical axis on the front end of each segmental pan adapted when said handles are pivoted inwardly to a position substantially tangential to the exterior of said composite pan means to abut the ends of said central pan handle to pivot the front ends of said segmental pans outwardly and resiliently retain the outer walls thereof in sealing engagement with the adjacent portions of the wall of said casing.

4. A filter, including, in combination, a casing comprising an upright cylinder having a horizontal platform therein and a door therein above said platform, a plurality of filter screens positioned within said casing having inlet means and outlet means, pan means resting on said platform below said screens adapted to collect sludge, comprising a pair of segmental pans each having an arcuate outer wall of substantially the radius of said cylindrical casing wall and being of a width to be insertable through said door and to substantially cover said horizontal platform exterior of said door and a center substantially rectangular pan also insertable through said door of a width to substantially cover the remainder of the platform between said segmental pans, and means to urge the outer arcuate walls of said segmental pans in sealing engagement with the adjacent portions of the wall of said casing comprising a U-shaped handle extending horizontally in front of said rectangular pan and a vertically extending resilient U-shaped handle mounted to pivot horizontally on a vertical axis on the front end of each segmental pan adapted when said handles are pivoted inwardly to a position substantially tangential to the exterior of said composite pan means to abut the end walls of said U-shaped central pan handle to pivot the front ends of said segmental pans outwardly and resiliently retain the outer walls thereof in sealing engagement with the adjacent portions of the wall of said casing.

5. A filter, including, in combination, a casing comprising an upright cylinder having a horizontal platform therein and a door therein above said platform, a plurality of filter screens positioned within said casing having inlet means and outlet means, pan means resting on said platform below said screens adapted to collect sludge, comprising a pair of segmental pans each having an arcuate outer wall of substantially the radius of said cylindrical casing wall and being of a width to be insertable through said door and to substantially cover said horizontal platform exterior of said door and a center substantially rectangular pan also insertable through said door of a width to substantially cover the remainder of the platform between said segmental pans, and means to urge the outer arcuate walls of said segmental pans in sealing engagement with the adjacent portions of the wall of said casing, comprising a handle extending horizontally in front of said rectangular pan and a vertically extending resilient handle mounted to pivot horizontally on a vertical axis on the front end of each segmental pan adapted when said handles are pivoted inwardly to a position substantially tangential to the exterior of said composite pan means to abut the ends of said center pan handle to pivot the front ends of said segmental pans outwardly and resiliently retain the outer walls thereof in sealing engagement with the adjacent portions of the wall of said casing, baffle means carried by at least one of said pans to overlie said inter-pan space to prevent sludge from falling in the inter-pan space and supplemental baffle means carried by said casing wall to prevent sludge from falling in the spaces between the front and rear of the center pan and casing wall.

6. A filter, including, in combination, a casing comprising an upright cylinder having a horizontal platform therein and a door therein above said platform, a plurality of filter screens positioned within said casing having inlet means and outlet means, pan means resting on said platform below said screens adapted to collect sludge, comprising a pair of segmental pans each having an arcuate outer wall of substantially the radius of said cylindrical casing wall and being of a width to be insertable through said door and to substantially cover said horizontal platform exterior of said door and a center substantially rectangular pan also insertable through said door of a width to substantially cover the remainder of the platform between said segmental pans, and means to urge the outer arcuate walls of said segmental pans in sealing engagement with the adjacent portions of the wall of said casing.

7. A filter, including, in combination, a casing comprising an upright cylinder having a horizontal platform therein and a door therein above said platform, a plurality of filter screens positioned within said casing having inlet means and outlet means, pan means resting on said platform below said screens adapted to collect sludge, comprising a pair of segmental pans each having an arcuate outer wall of substantially the radius of said cylindrical casing wall and being of a width to be insertable through said door and to substantially cover said horizontal platform exterior of said door and a center substantially rectangular pan also insertable through said door of a width to substantially cover the remainder of the platform between said segmental pans in sealing engagement with the adjacent portions of the wall of said casing and baffle means carried by at least one of said pans to overlie said inter-pan space to prevent sludge from falling in the inter-pan space.

8. A filter, including, in combination, a casing comprising an upright cylinder having a horizontal platform therein and a door therein above said platform, a plurality of filter screens positioned within said casing having inlet means and outlet means, pan means resting on said platform below said screens adapted to collect sludge, comprising a pair of segmental pans each having an arcuate outer wall of substantially the radius of said cylindrical casing wall and being of a width to be insertable through said door and to substantially cover said horizontal platform exterior of said door and a center substantially rectangular pan also insertable through said door of a width to substantially cover the remainder of the platform between said segmental pans, means to urge the outer arcuate walls of said segmental pans in sealing engagement with the adjacent portions of the wall of said casing and baffle means mounted to overlie said inter-pan space to prevent sludge from falling in the inter-pan space.

9. A filter, including, in combination, a casing comprising an upright cylinder having a horizontal platform therein and a door therein above said platform, a plurality of filter screens positioned within said casing having inlet means and outlet means, pan means resting on said platform below said screens adapted to collect sludge, comprising a pair of segmental pans each having an arcuate outer wall of substantially the radius of said cylindrical casing wall and being of a width to be insertable through said door and to substantially cover said horizontal platform exterior of said door and a center substantially rectangular pan also insertable through said door of a width to substantially cover the remainder of the platform between said segmental pans, means to urge the outer arcuate walls of said segmental pans in sealing engagement with the adjacent portions of the wall of said casing and baffle means mounted to overlie said inter-pan space to prevent sludge from falling in the inter-pan space and in the spaces between the front and rear of said center pan and casing wall.

10. A filter, including, in combination, a casing comprising an upright cylinder having a horizontal platform therein and a door therein above said platform, a plurality of filter screens positioned within said casing having inlet means and outlet means, pan means resting on said platform below said screens adapted to collect sludge, comprising a pair of segmental pans each having an arcuate outer wall of substantially the radius of said cylindrical casing wall and being of a width to be insertable through said door and to substantially cover said horizontal platform exterior of said door and a center substantially rectangular pan also insertable through said door of a width to substantially cover the remainder of the platform between said segmental pans, means to urge the outer arcuate walls of said segmental pans in sealing engagement with the adjacent portions of the wall of said casing and baffle means projecting laterally from the upper ends of the side walls of said center pan to prevent sludge from falling in the inter-pan space.

11. A filter, including, in combination, a casing comprising an upright cylinder having a horizontal platform therein and a door therein above said platform, a plurality of filter screens positioned within said casing having inlet means and outlet means, pan means resting on said platform below said screens adapted to collect sludge, comprising a pair of segmental pans each having an arcuate outer wall of substantially the radius of said cylindrical casing wall and being of a width to be insertable through said door and to substantially cover said horizontal platform exterior of said door and a center substantially rectangular pan also insertable through said door of a width to substantially cover the remainder of the platform between said segmental pans, means to urge the outer arcuate walls of said segmental pans in sealing engagement with the adjacent portions of the wall of said casing, baffle means projecting laterally from the upper ends of the side walls of said center pan to overlie said inter-pan space to prevent sludge from falling in the inter-pan space and supplemental baffle means carried by said casing wall to prevent sludge from falling in the space between the first and rear of the center pan and casing wall.

NICHOLAS G. MONSARRAT.
NORMAN S. HUMES.